(12) United States Patent
Nylund

(10) Patent No.: US 6,347,130 B1
(45) Date of Patent: *Feb. 12, 2002

(54) FUEL ASSEMBLY WITH SHORT FUEL UNITS

(75) Inventor: Olov Nylund, Västerås (SE)

(73) Assignee: Westinghouse Atom AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/666,372

(22) PCT Filed: Dec. 8, 1995

(86) PCT No.: PCT/SE95/01478

§ 371 Date: Jun. 27, 1996

§ 102(e) Date: Jun. 27, 1996

(87) PCT Pub. No.: WO96/20483

PCT Pub. Date: Jul. 4, 1996

(30) Foreign Application Priority Data

Dec. 23, 1994 (SE) .............................................. 9404497

(51) Int. Cl.$^7$ ................................................. G21C 3/30
(52) U.S. Cl. ...................... 376/433; 376/305; 376/414; 376/435; 376/439; 376/440; 376/446; 376/451
(58) Field of Search ............................... 376/433, 428, 376/435, 439, 440, 446, 434, 451, 416, 417, 420, 414, 444, 305, 352

(56) References Cited

U.S. PATENT DOCUMENTS

| | | | | |
|---|---|---|---|---|
| 2,938,848 A | * | 5/1960 | Ladd et al. .................. | 376/446 |
| 3,015,616 A | * | 1/1962 | Sturtz et al. ............. | 204/193.2 |
| 3,127,324 A | * | 3/1964 | Parr et al. .................... | 376/433 |
| 3,128,235 A | * | 4/1964 | Hackney et al. ............... | 176/77 |
| 3,141,830 A | * | 7/1964 | Klepfer et al. ............... | 376/451 |
| 3,142,627 A | * | 7/1964 | Emerson ...................... | 176/78 |
| 3,161,571 A | * | 12/1964 | Harrer et al. ................ | 376/446 |

(List continued on next page.)

FOREIGN PATENT DOCUMENTS

| | | | | |
|---|---|---|---|---|
| CA | 619994 | * | 5/1961 | ................. 376/433 |
| CA | 1 250 966 | | 12/1985 | |
| DE | 1184024 | * | 12/1964 | ................. 376/428 |
| DE | 2204168 | * | 8/1973 | ................. 376/433 |
| DE | 4108767 | * | 10/1992 | ................. 376/433 |
| DE | 4117623 | * | 2/1993 | ................. 376/434 |
| DE | 3141402 | | 4/1993 | |
| EP | 0065697 | * | 12/1982 | ................. 376/435 |
| GB | 918370 | * | 2/1963 | ................. 376/433 |
| GB | 992021 | * | 5/1965 | ................. 376/433 |

(List continued on next page.)

OTHER PUBLICATIONS

Cirimello et al., Recent Developments in Power Reactor Fuel in Argentina, Improvements in Water Reactor Fuel Technology and Utilization, Proceeding of a Symposium, Stockholm, Sep. 15–19, 1986, International Atomic Energy Agency, Vienna, 1987, pp. 207–217.

Primary Examiner—Harvey E. Behrend
(74) Attorney, Agent, or Firm—Connolly Bove Lodge & Hutz LLP

(57) ABSTRACT

A fuel assembly for a boiling water reactor comprising a plurality of fuel units, stacked on top of each other, each of which comprising a plurality of fuel rods extending vertically between a top tie plate and a bottom tie plate, and means for keeping the fuel elements together. The fuel elements are surrounded by a fuel channel with a substantially square cross section. At least two of the fuel units differ from each other in regard to fuel distribution or free flow area.

14 Claims, 9 Drawing Sheets

U.S. PATENT DOCUMENTS

| | | | | |
|---|---|---|---|---|
| 3,164,529 A | * | 1/1965 | Waine et al. | 176/78 |
| 3,170,848 A | * | 2/1965 | Saunders | 176/77 |
| 3,172,820 A | * | 3/1965 | Lenngren et al. | 376/433 |
| 3,185,630 A | * | 5/1965 | Ammon | 376/434 |
| 3,189,524 A | * | 6/1965 | Hocker et al. | 176/71 |
| 3,212,983 A | * | 10/1965 | Kornbichler | 376/435 |
| 3,212,990 A | * | 10/1965 | Martha | 176/78 |
| 3,231,474 A | * | 1/1966 | Jones et al. | 376/377 |
| 3,235,463 A | * | 2/1966 | Sankovich | 176/17 |
| 3,284,310 A | * | 11/1966 | Straat | 176/54 |
| 3,287,230 A | * | 11/1966 | Jerkins et al. | 176/77 |
| 3,317,398 A | * | 5/1967 | Hutter | 376/432 |
| 3,368,945 A | * | 2/1968 | Keller et al. | 376/433 |
| 3,393,128 A | * | 7/1968 | Obertelli et al. | 376/439 |
| 3,574,058 A | * | 4/1971 | Gumchian | 176/78 |
| 3,663,365 A | * | 5/1972 | Pettinger et al. | 376/433 |
| 3,679,545 A | * | 7/1972 | Leirvik | 376/451 |
| 3,823,068 A | * | 7/1974 | Worlton et al. | 376/451 |
| 4,040,902 A | * | 8/1977 | Mysels | 376/433 |
| 4,326,922 A | * | 4/1982 | Ferrari et al. | 376/435 |
| 4,576,785 A | * | 3/1986 | Clements et al. | 376/435 |
| 4,642,217 A | | 2/1987 | Wilson et al. | 376/451 |
| 4,716,015 A | * | 12/1987 | Carlson | 376/446 |
| 4,762,676 A | * | 8/1988 | Gjertsen et al. | 376/439 |
| 4,781,884 A | * | 11/1988 | Anthony | 376/439 |
| 5,009,837 A | * | 4/1991 | Nguyen et al. | 376/446 |
| 5,116,567 A | * | 5/1992 | Fennern | 376/433 |
| 5,162,097 A | * | 11/1992 | Fennern | 376/433 |
| 5,202,084 A | * | 4/1993 | Fennern et al. | 376/433 |
| 5,209,897 A | * | 5/1993 | Congdon et al. | 376/438 |
| 5,219,517 A | | 6/1993 | Nylund | 376/352 |
| 5,265,137 A | * | 11/1993 | Busch | 376/414 |
| 5,274,686 A | * | 12/1993 | Bryan | 376/414 |
| 5,283,812 A | * | 2/1994 | Verdier | 376/310 |
| 5,339,342 A | * | 8/1994 | Meier et al. | 376/446 |
| 5,359,634 A | * | 10/1994 | Johannesson | 376/435 |
| 5,383,229 A | * | 1/1995 | Nakajima et al. | 376/435 |
| 5,422,922 A | * | 6/1995 | Masumi et al. | 376/447 |
| 5,434,896 A | * | 7/1995 | Bryan et al. | 376/414 |
| 5,479,464 A | * | 12/1995 | DeMario et al. | 376/446 |

FOREIGN PATENT DOCUMENTS

| | | | | |
|---|---|---|---|---|
| GB | 1283195 | * | 7/1972 | 376/433 |
| GB | 1403491 | * | 8/1975 | 376/433 |
| JP | 418758 | * | 5/1966 | 376/435 |
| JP | 0050498 | * | 4/1971 | 376/435 |
| JP | 4153987 | * | 12/1979 | 376/435 |
| JP | 2287183 | * | 12/1987 | 376/435 |
| JP | 4303796 | * | 10/1992 | 376/435 |

* cited by examiner

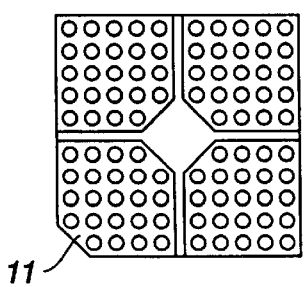
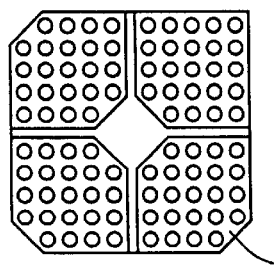
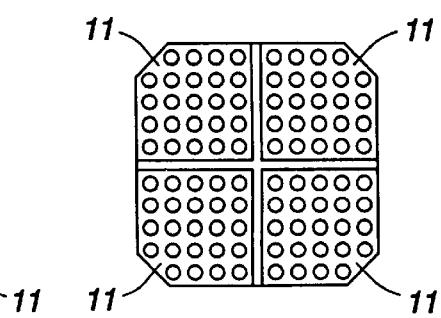
FIG. 3a  FIG. 3b  FIG. 3c
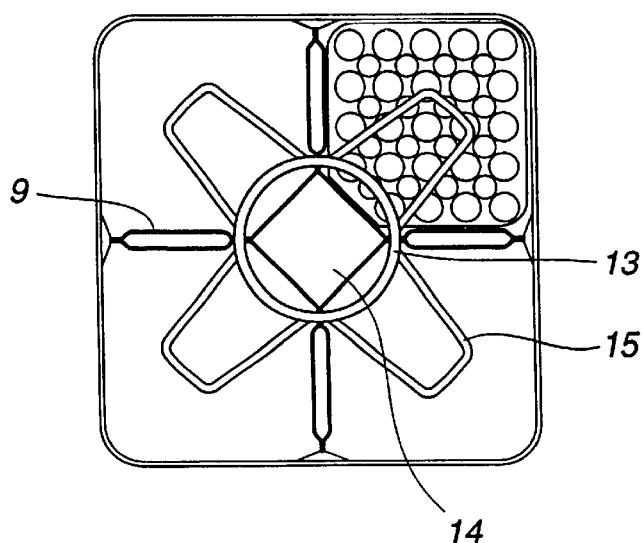
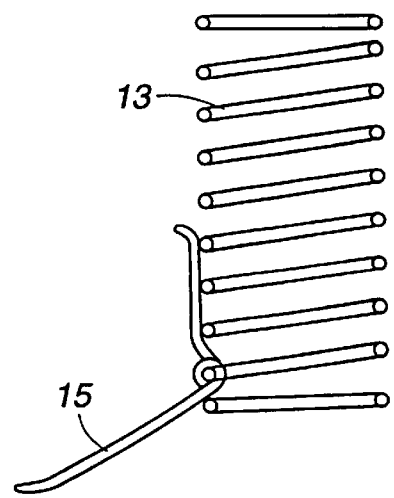
Fig. 4a  Fig. 4b

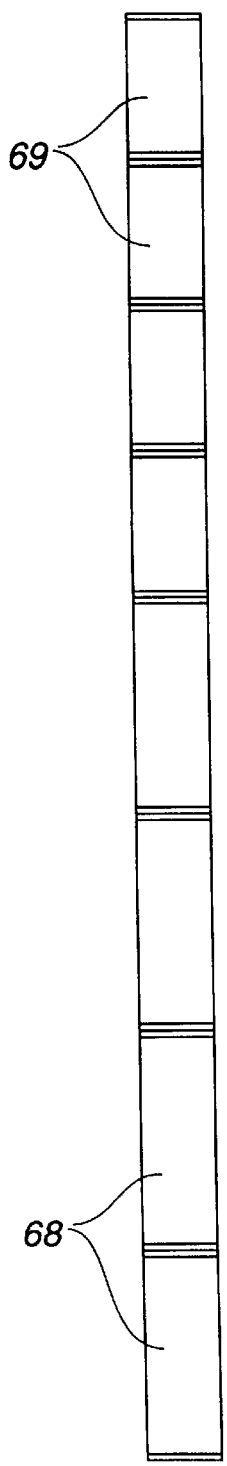
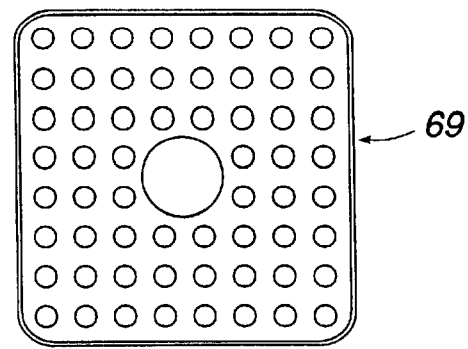
*Fig. 15b*
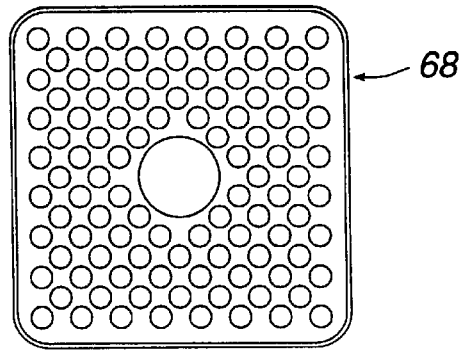
*Fig. 15c*
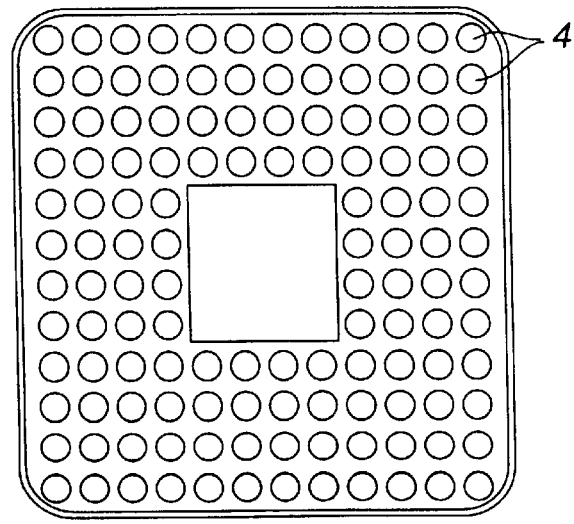
*Fig. 15a*   *Fig. 16*

FUEL ASSEMBLY WITH SHORT FUEL UNITS

TECHNICAL FIELD

The present invention relates to a fuel assembly for a boiling water reactor comprising a plurality of fuel rods extending between a top tie plate and a bottom tie plate and being surrounded by a fuel channel with a substantially square cross section.

BACKGROUND OF THE INVENTION

In a boiling water nuclear reactor, moderated by light water, the fuel is in the form of fuel rods, each of which contains a stack of pellets of a nuclear fuel arranged in a cladding tube. A fuel bundle comprises a plurality of fuel rods arranged in parallel with each other in a certain definite, normally symmetrical pattern, a so-called lattice, and is retained at the top by a top tie plate and at the bottom by a bottom tie plate. To keep the fuel rods spaced from each other and prevent them from bending or vibrating when the reactor is in operation, a number of spacers are distributed along the fuel bundle in the longitudinal direction. A fuel assembly comprises one or more fuel bundles, each of which extends along the main part of the length of the fuel assembly, surrounded by a substantially square fuel channel.

A core in a boiling water reactor comprises several hundred fuel assemblies arranged vertically in the core in a certain spaced relationship to each other. The fuel assemblies are arranged in a symmetrical lattice with each fuel assembly included in two rows of fuel assemblies perpendicular to each other. The core also comprises control rods with four blades, extending perpendicularly to each other from a central part and forming a right-angled cross. The control rods are arranged with each of their blades between two fuel assemblies located in the same row, such that each control rod together with four fuel assemblies arranged around its fuel blades forms one unit.

The core is immersed into water which serves both as coolant and as neutron moderator. During operation, the water flows from below and upwards through the fuel assembly, whereby part of the water is transformed into steam. The percentage of steam increases towards the top of the fuel assembly. In the lower part of the fuel assembly, the coolant is in singlephase state and in the upper part thereof in two-phase state. This difference between the upper and lower parts gives rise to special problems which must be taken into account when the fuel is formed, such as the following:

the pressure drop is several times higher in the upper part of the fuel assembly than in the lower part thereof, which, among other things increases the risk of thermohydraulic instability;

there is a risk of dryout in the upper part of the fuel assembly but not in the lower part thereof; and the neutron moderation is less effective in the upper part, which leads to the fuel not being burnt up as quickly in the upper part of the fuel assembly as in the lower part thereof.

Therefore, it is desirable to achieve a fuel assembly which in a simple manner can be designed where the upper part of the fuel assembly differs from the lower part, and where the fuel distribution and the free flow area may be varied in the axial direction to obtain optimum conditions.

One problem with conventional fuel assemblies for boiling water reactors is that they are not sufficiently flexible and that it is therefore difficult to give them different designs in the upper and the lower part. It is also difficult to obtain an optimum fuel distribution in the axial direction.

A fuel bundle for a boiling water reactor is normally about four meters in length and has a width which varies between 0.05 and 0.2 mm. The considerable length of the fuel bundle in relation to the width thereof entails difficulties in the manufacture, transport, handling, and storage of the fuel bundles. Another disadvantage with full-length fuel rods is that they contain large quantities of uranium and harmful fission products. This means that fuel damage to a fuel rod may have serious consequences since considerable quantities of uranium and fission products risk leaking out into the coolant.

Experience shows that, for example in connection with repairs and service of a nuclear reactor, debris may enter, for example metal chips, which then move with the water which circulates through the core. It has been found that these debris may give rise to abrasion damage to the cladding tube. The abrasion damage normally arises on a level with the spacers because the debris adhere to the spacers and remain there and subject the cladding tube to wear. Penetrating water then tends to give rise to considerable secondary damage, often far away from the primary site of the damage.

British patent specification No. 1 403 491 shows a fuel element for a nuclear reactor containing a plurality of short fuel units, each one consisting of a plurality of fuel rods arranged in parallel with each other between a top tie plate and a bottom tie plate. The fuel rods are also supported by intermediate spacers. The fuel units are fitted onto a supporting tube in such a way that the bottom plate of one fuel unit rests on the top plate of the other, and that the fuel rods in each fuel unit are parallel to the fuel rods in the other fuel units. The supporting tube with the fuel units extends through the whole fuel assembly. The fuel units have a substantially circular cross section along their longitudinal axis. This fuel element is intended to be used in a heavy-water moderated nuclear reactor. A heavy-water moderated nuclear reactor comprises a plurality of pressure-supporting cooling channels. During their operating period, the fuel elements are inserted into these cooling channels.

Another embodiment of short fuel units is known from Canadian patent specification No. 1 250 966. Each fuel unit is sufficiently short to eliminate the need for intermediate spacers. Also these fuel units are primarily intended to be used in a heavy-water moderated reactor, especially with pressure tubes, and have a substantially circular cross section along the whole of their length.

The need of a flexible fuel assembly for a boiling water reactor is connected with the problems which arise due to the water—which is both the moderator and the coolant—boiling and the special requirements therefore made on the upper and lower parts of the fuel assembly. These problems have been known for a long time (since the early 60's).

Using short fuel units in a heavy-water moderated reactor has been known since the childhood of nuclear engineering. The conditions for a heavy-water moderated and a light-water moderated nuclear reactor are, however, very different; for example, a heavy water moderated reactor has a low burnup and a high linear power density compared with a light-water moderated reactor which has a high burnup but a lower linear power density. A decisive difference in comparison with a light-water moderated reactor of boiling-water type is that the moderation is completely dominated by a large volume of separate moderator water, which is not allowed to boil in current heavy-water reactors. This means that the moderation is essentially constant in the axial direction along the fuel units.

Nor is the cooling water allowed to boil in current heavy-water reactors. For that reason, there is not the same need of an axial variable fuel design.

SUMMARY OF THE INVENTION

The invention provides a fuel assembly for a boiling water reactor, moderated by light water, wherein:

it is simple to give the fuel assembly different designs in the upper and the lower part;

flexibility is achieved for optimization of fuel distribution in the axial direction, both initially and in partially burnt-up state;

flexibility is achieved for lattice optimization both in the axial direction and in the radial direction;

the consequences in case of cladding damage, in the form of leakage of fuel and fission products, are smaller than for a traditional fuel;

the risk of abrasion damage caused by debris in the cooling water is smaller than for a traditional fuel; and the manufacture, transport, handling, and storage of the fuel assembly are simplified.

According to the invention, this is achieved by dividing the fuel bundles into a plurality of short fuel units. Compared with heavy-water reactors and the applications known there-from, light-water boiling reactors place essentially different requirements on the design of the fuel:

the fuel units shall constitute a constructive part of a retained fuel assembly with associated fuel channels with a substantially square cross section;

a burnup several times higher must be attained without the fission gas pressure in the short fuel rods becoming too high;

the thermohydraulic requirements during boiling must be satisfied by actions to promote the utilization of the coolant in the upper part of the fuel assembly, and by limiting the pressure drop there; and the nuclear requirements during boiling in combination with light-water moderation must be satisfied by ensuring moderation internally in the assembly, and by adapting the distribution of fissile material axially in the assembly.

What characterizes a fuel assembly according to the invention will become clear from the appended claims.

BRIEF DESCRIPTION OF THE DRAWINGS

FIGS. 3a–3c show examples of what is intended by a substantially square cross section.

FIG. 4a shows a section IVA–IVA' through the fuel assembly in FIG. 1.

FIG. 4b shows a spring arrangement for retaining the fuel units.

FIGS. 15a–15c schematically show an additional embodiment of a fuel assembly according to the invention where the fuel units in the upper and lower parts of the fuel assembly have different lattices.

FIG. 16 shows a cross section through a fuel assembly with 12×12 fuel rod positions.

DESCRIPTION OF THE PREFERRED EMBODIMENTS

Figure 1:
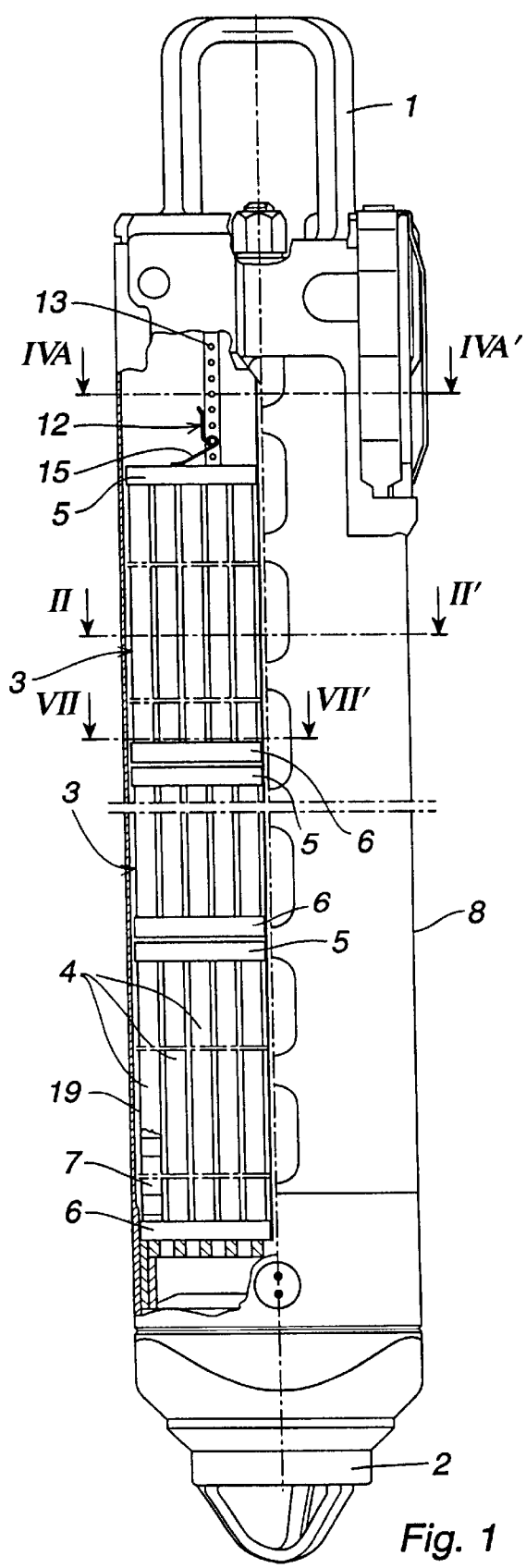
FIG. 1 schematically shows a fuel assembly according to the invention.

FIG. 1 shows a fuel assembly according to the invention. The fuel assembly comprises an upper handle 1, a lower end portion 2, and a plurality of fuel units 3 stacked one above the other. Each fuel unit comprises a plurality of fuel rods 4 arranged in parallel and in a definite space relationship to each other in a given lattice, and a top tie plate 5 and a bottom tie plate 6 for attachment of the fuel rods in their respective positions in the lattice. The fuel units 3 are stacked on top of each other in the longitudinal direction of the fuel assembly and they are stacked in such a way that the top tie plate 5 in one fuel unit is facing the bottom tie plate 6 in the next fuel unit in the stack, and such that the fuel rods in all the fuel elements are parallel to each other. A fuel rod 4 comprises fuel in the form of a stack of pellets 7 of uranium arranged in a cladding tube 19.

Figure 2:
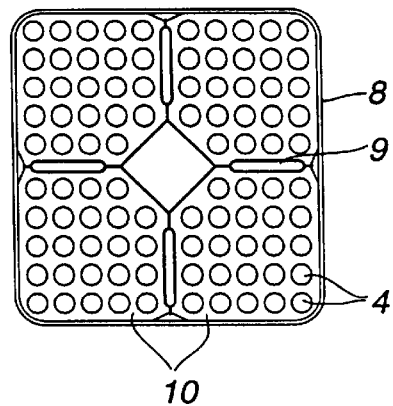
FIG. 2 shows a section II–II' through the fuel assembly in FIG. 1.

FIG. 2 shows a section II–II' through the fuel assembly in FIG. 1. The fuel assembly is enclosed in a fuel channel 8 with a substantially square cross section. The fuel channel is provided with a hollow support member 9 of cruciform cross section which is secured to the four walls of the fuel channel. In the central channel 14 formed by the support member 9, moderator water flows. The fuel channel with the support member surrounds four vertical channel-formed parts 10, so-called sub-channels, with an at least substantially square cross section. The four sub-channels each contain a stack of fuel units. Each fuel unit comprises 24 fuel rods 4 arranged in a symmetrical 5×5 lattice.

The fuel assembly in FIG. 2 comprises 10×10 fuel rod positions. By a fuel rod position is meant a position in the lattice. All the fuel rod positions in the lattice need not be occupied by fuel rods. In certain fuel assemblies, a number of fuel rods have been replaced by one or more water channels. The introduction of a water channel changes the number of fuel rods but not the number of fuel rod positions.

Figure 2A:
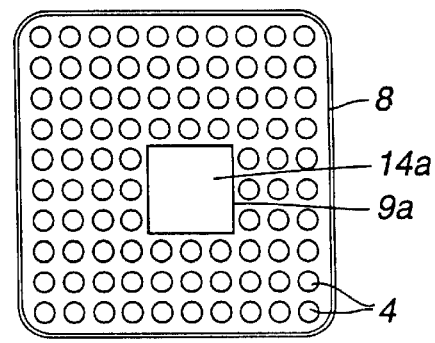
FIGS. 2a and 2b show other embodiments of a fuel assembly according to the invention.

FIG. 2a shows another embodiment of a fuel assembly according to the invention. The figure shows a horizontal section through the fuel assembly which is provided with an internally arranged vertical channel 14a through which water is conducted in a vertical direction from below and upwards through the assembly. The channel 14a is surrounded by a tube 9a with a substantially square cross section. The fuel units are kept in position by being fitted onto the tube which surrounds the vertical channel.

Figure 2B:
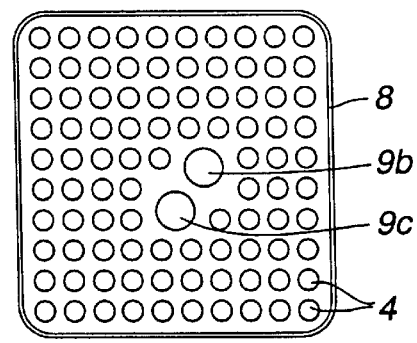

FIG. 2b shows an additional embodiment of a fuel assembly according to the invention. The figure shows a horizontal section through the fuel assembly which is provided with two centrally arranged vertical water rods 9a and 9c through which water is conducted from below and upwards through the assembly. The water rods have a diameter which is somewhat larger than the diameter of the fuel rods and are designed with a substantially circular cross section. The fuel units are kept in position by being fitted onto the water rods.

FIGS. 3a–3c show examples of what is meant by a substantially square cross section. The fuel assembly in FIG. 3a has a reduced corner portion 11. The fuel assembly in FIG. 3b has two reduced corner portions. The fuel assembly in FIG. 3c has four reduced corner portions. The reduction of a corner portion reduces the number of fuel rods in the fuel unit by one fuel rod compared with a fuel unit without a reduced corner portion.

In a boiling water reactor, cooling water flows upwards through the fuel, whereby part of the water is transformed into steam. This results in a greater pressure drop in the upper part of the fuel assembly than in the lower part thereof. This difference gives rise to a force which tends to raise the fuel upwards. In conventional fuel assemblies, the fuel bundles are kept in position because of their weight. In a fuel assembly with short fuel units there is a risk of the upper fuel units being raised upwards by these forces.

To prevent certain fuel units from being pressed upwards, a spring means 12 is arranged in the upper part of the fuel assembly. FIG. 4a shows a section IVA–IVA' through the fuel assembly in FIG. 1. FIG. 4b shows in more detail the appearance of a spring means 12 in FIG. 1. The spring means 12 comprises a spiral spring 13 arranged in a slit in the support means 9 around the central channel 14. The spring 13 is provided with four radially extending arms 15, each of which presses down a stack of fuel units. This arrangement gives each stack of fuel units a freedom to grow in relation to the fuel channel independently of how the other stacks grow. Two types of growth occur in the fuel units, namely, thermal growth and irradiation growth.

Figures 5A, 5B, 6A, 6B:
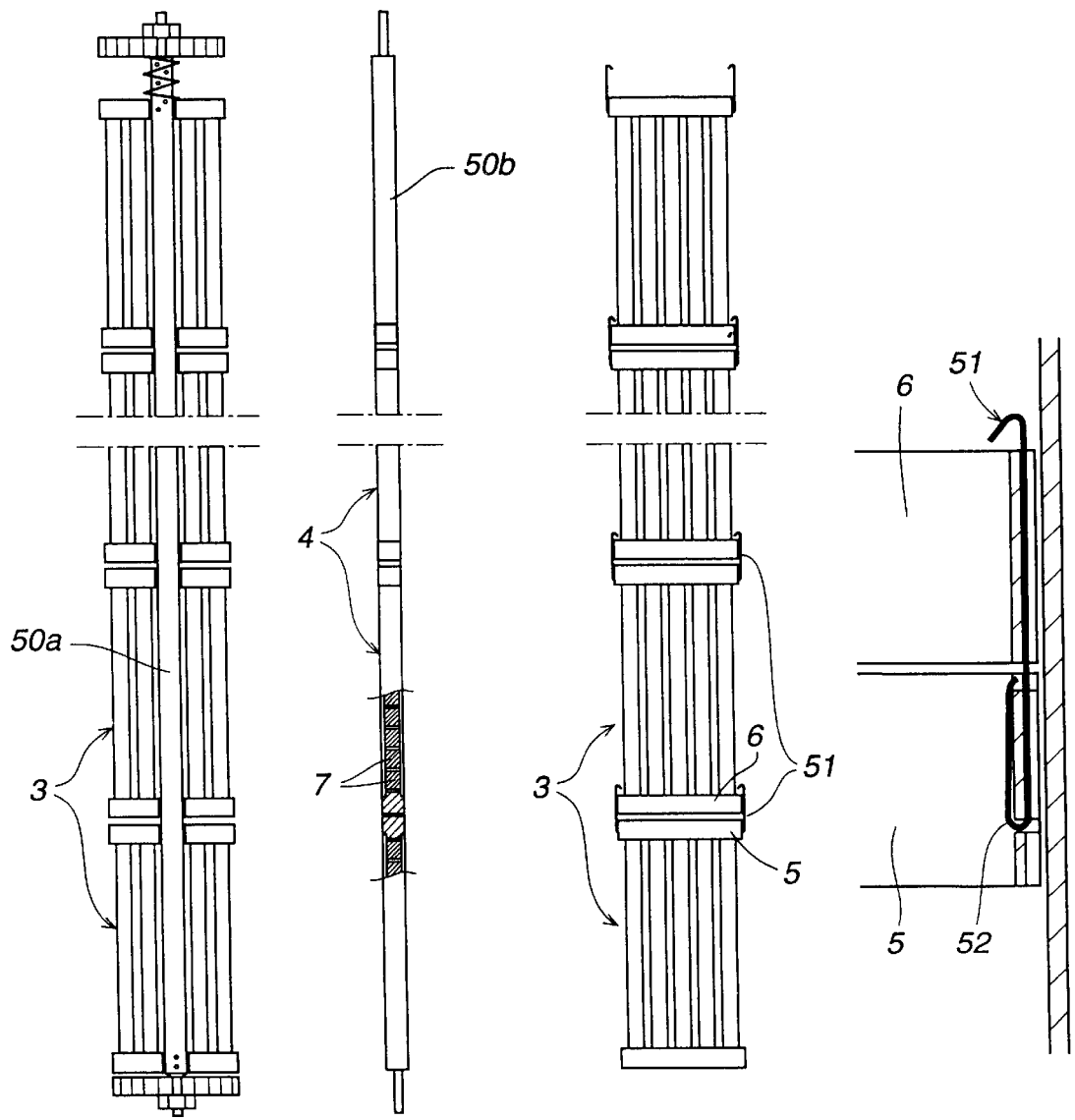
FIGS. 5a and 5b show a supporting rod for retaining the fuel units.
FIGS. 6a and 6b show a clutch spring for retaining the fuel units.

FIG. 5a shows another embodiment where the fuel units 3 are kept in position by being fitted onto a common supporting member. The common supporting member may, for example, be a tube 50a which conducts non-boiling water. The advantage of using one or more water-filled tubes as a common supporting element is that non-boiling water may be moved into the central parts of the fuel assembly and hence attain an improved moderation. The common supporting member may, for example, comprise a plurality of joined-together short fuel rods (50b) as shown in FIG. 5b. The advantage of allowing the supporting member to comprise a plurality of short fuel rods instead of one long fuel rod is that the previously mentioned risks in case of fuel damage are reduced.

FIGS. 6a and 6b show another arrangement for keeping the fuel units in place. Two fuel units are connected to each other by four connecting springs 51 arranged between the top tie plate of the lower fuel unit and the bottom tie plate of the upper fuel unit. The connecting spring comprises an attachment loop 52, which may, for example, be of Inconel or some other nickel-base alloy. The connecting springs are easy to open such that the fuel units may change be rearranged or replaced during refuelling. The springs cannot be unintentionally opened when the bundle stands in the fuel channel or is being raised.

Figure 7:
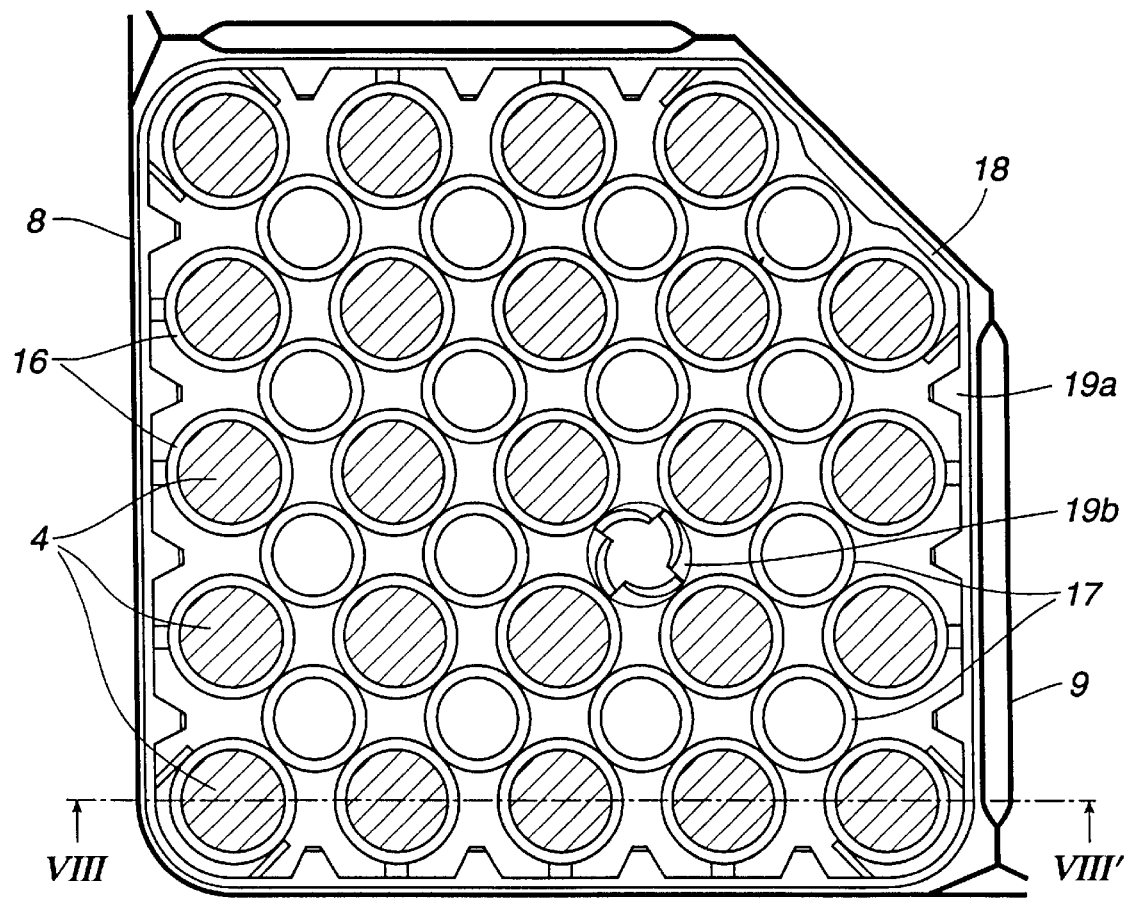
FIG. 7 shows a bottom tie plate in a section VII–VII' through the fuel assembly in FIG. 1.
Figure 8:
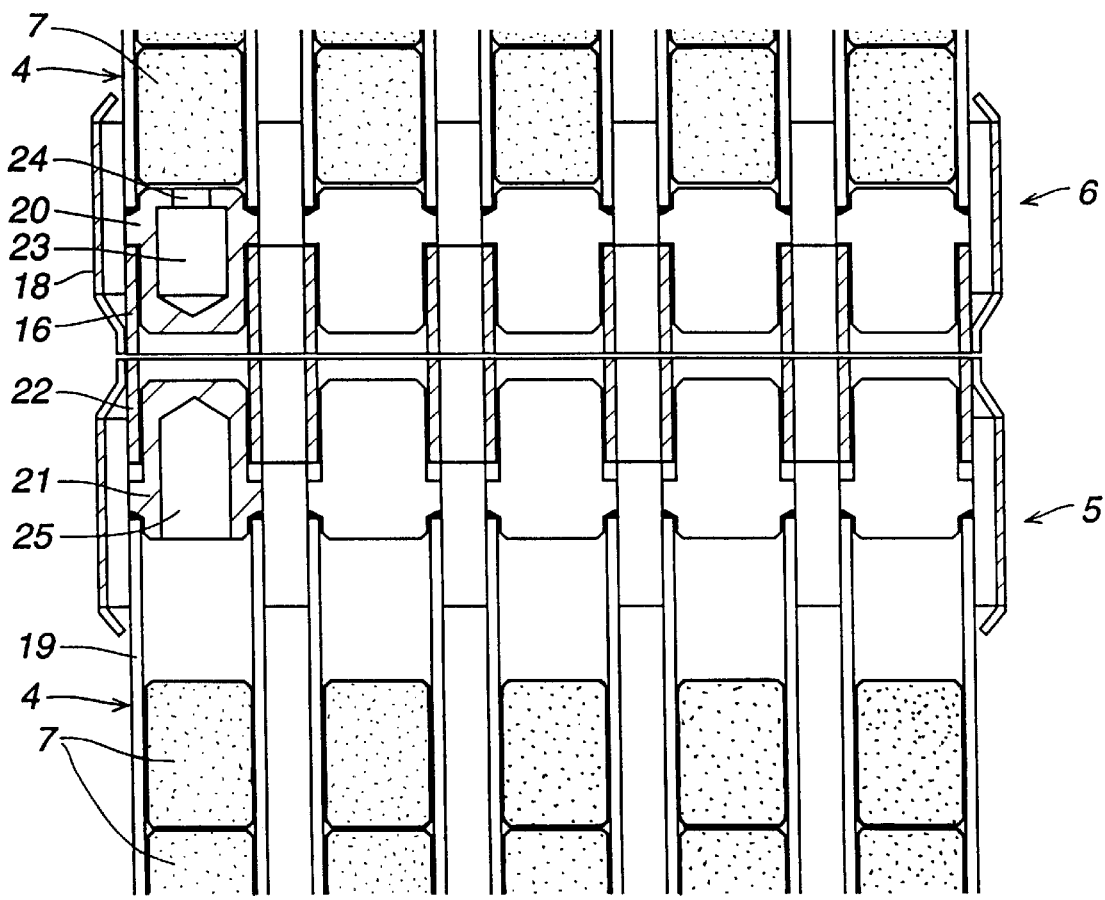
FIG. 8 shows in a section VIII–VIII' in FIG. 7 how the fuel rods in the fuel units are attached to the top tie plate and the bottom tie plate.

FIG. 7 is a section VII–VII' through the fuel assembly in FIG. 1 and shows an example of a bottom tie plate 6. FIG. 8 shows the bottom tie plate in a section D—D in FIG. 7. The bottom tie plate comprises an orthogonal latticework composed of tubular sleeves 16, 17 and surrounded by a frame 18. The function of the frame 18 is to guide the fuel units when charging the fuel, keep the fuel rods at a certain distance from the fuel channel 8, and to scrape off water from the walls of the fuel channel, especially in the upper part of the channel. The frame is provided with guiding vanes 19a, the function of which is two-fold, namely, to facilitate the introduction of the fuel unit into the cladding tube, and to increase the mixing of cooling flow. The sleeves are of two different types, namely, fixing sleeves 16 in which the fuel rods 4 are fixed, and supporting sleeves 17 which support and fix the fixing sleeves. The fixing sleeves have the same or almost the same diameter as the cladding tube of the fuel rods. The fixing sleeves are arranged in a symmetrical 5×5 lattice which corresponds to the lattice of the fuel rods, and the supporting sleeves are arranged between the fixing sleeves to support these.

The supporting sleeves 17 may be provided with mixing vanes 19b to increase the mixing of the coolant flow. The mixing should primarily be performed in the upper part of the fuel assembly, where the risk of dryout is greatest. The fuel assembly preferably comprises two types of fuel units, of which one type has bottom tie plates with mixing vanes and the other type has bottom tie plates with no mixing vanes. The fuel units whose bottom tie plates have mixing vanes are arranged in the upper part of the fuel assembly and those without mixing vanes are arranged in the lower part of the fuel assembly.

The top tie plate 5 may be designed as the bottom tie plate described above. The frame of the top tie plate is suitably provided with a marking for identification of the respective fuel unit. The top tie plate shall also be capable of being gripped by a lifting tool.

FIG. 8 shows how the fuel rods 4 are attached to the top tie plate 5 and to the bottom tie plate 6. In the lower part of the fuel rod 4, a bottom plug 20 is arranged, the free end of which is inserted into the fixing sleeve 16 in the bottom tie plate 6. In the uppermost part of the fuel rod, a top plug 21 is arranged, the free end of which is inserted into a fixing sleeve 22 in the top tie plate 5.

During the burnup of the nuclear fuel, fission gases contained in the fuel rod are released. To prevent the pressure on the cladding from becoming too great, an expansion space for the fission gases is needed. The bottom plug 20 is provided with a cavity 23 to receive fissile gases, and that part of the bottom plug which faces the uranium pellets has an opening between the cavity and the remainder of the fuel rod. In the upper part of the fuel rod, the stack of uranium pellets ends somewhat below the top plug 21 which is provided with a cylindrical recess 25, the opening of which faces the uranium pellets. The space between the top plug and the uranium pellets and the space in the top plug may be utilized for expansion of the fissile gases.

The uranium-free parts of the fuel rods give a reduced neutron absorption, which leads to an increase of the effect in the uranium pellets nearest the top and bottom plugs. To reduce the effect and to further increase the space for the fission gases, uranium pellets with holes may preferably be used nearest the top and bottom plugs. It may also be suitable to give these pellets a lower enrichment. It is important that the emission of fission gases be kept at a low level, such that the required fission space becomes as small as possible. This is achieved by a low linear rod load (kW/m) which is made possible by a large number of fuel rods (96 in the embodiment) in the highly loaded cross section of the assembly. An additionally larger number of rods may also be advantageous. The number of fuel rod positions should at least be 80, preferably more than 90, for the fission gas emission to be sufficiently low to be taken care of in the short fuel units. The fission gas emission may be further reduced by additions to the fuel pellets.

Figure 9A:
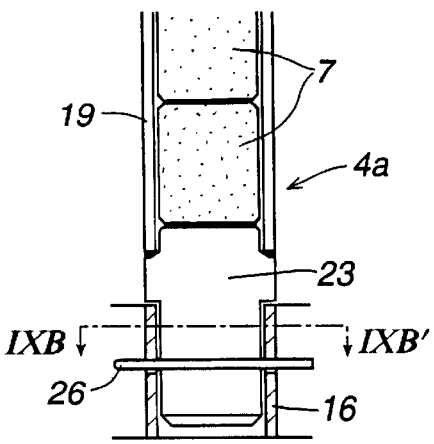
FIG. 9a shows an example of how a retaining fuel rod may be fixed to the top tie plate and/or the bottom tie plate.
Figure 10:
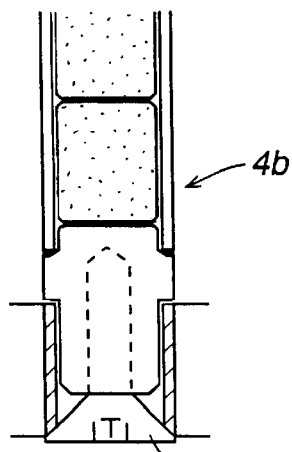
FIG. 10 shows an additional example of how a retaining fuel rod may be fixed to the top tie plate and/or the bottom tie plate.
Figure 9B:
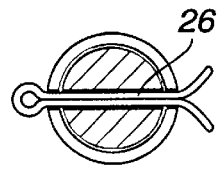
FIG. 9b shows a section IXB–IXB' through the attachment device in FIG. 1.

A fuel unit comprises a small number of, for example two, retaining fuel rods which are fixed to the top tie plate and the bottom tie plate. The retaining fuel rods retain the fuel unit such that the other fuel rods are kept in position. FIG. 9a shows how a retaining fuel rod 4a may be fixed to the fixing sleeve 16 of the bottom tie plate with a cleaving rivet 26. FIG. 9b shows a section IXB–IXB' in FIG. 9a. FIG. 10 shows how a retaining fuel rod 4b may be fixed to the fixing sleeve 16 with a screw joint 27.

Figure 11A:
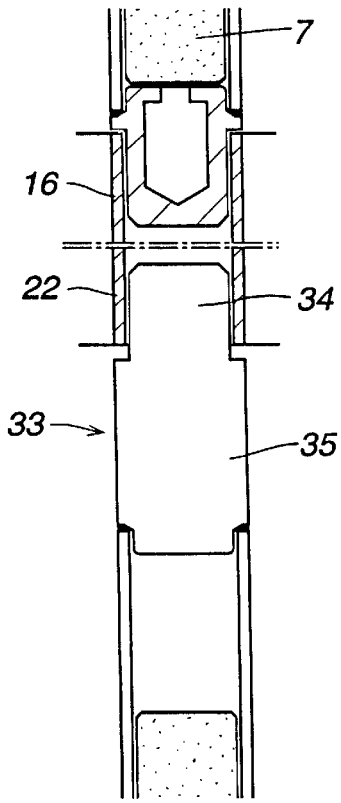
FIGS. 11a, 11b and 11c show different embodiments of where the risk of abrasion damage in the region nearest below the top tie plate has been reduced.
Figure 11B:
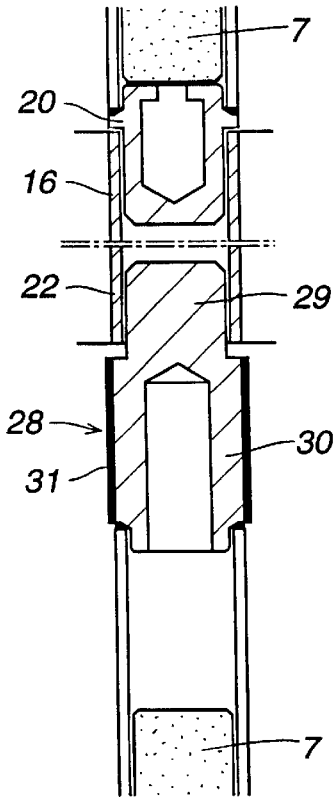
Figure 11C:
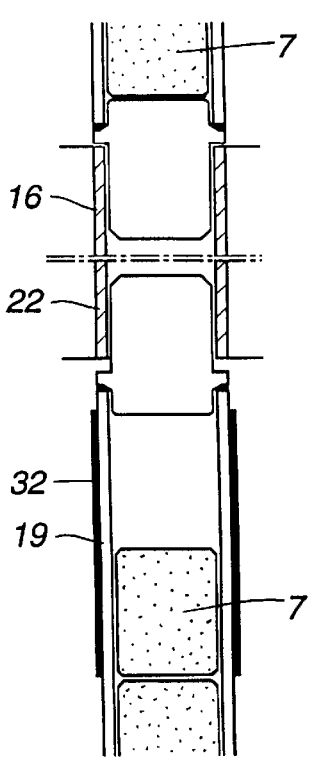

In a conventional fuel assembly, with full-length fuel rods, which are retained by a plurality of spacers along their axial length, abrasion damage normally arises on a level with the spacers because debris adhering thereto remain and wear holes in the cladding. Because no spacers are needed in a fuel assembly according to the invention, the risk of abrasion damage to the fuel is reduced. However, a risk of abrasion damage remains in the region below the top tie plate. FIGS. 11a–11c show different alternatives for reducing the risk of cladding damage caused by abrasion in this region. Because the rods need not be drawn through spacers during mounting, a larger outer diameter may be allowed in this region, for example by a wear-resistant coating.

FIG. 11a shows a top plug 33 which has an upper solid part 34, for connection to the fixing sleeve 22 in the top tie plate, and a lower solid 35. The lower part 35 is longer than the upper part 34. The lower part is arranged in the region with the greatest risk of abrasion damage.

FIG. 11b shows a top plug 28 which has an upper solid part 29 and a lower hollow part 30. The lower part 30 is longer than the upper part 29 and is provided with a coating 31 which protects against abrasion damage, for example zirconium oxide or aluminium oxide.

FIG. 11c shows a fuel rod, the cladding tube 19 of which in its upper part, where the risk of abrasion damage is greatest, is provided with a coating 32 protecting against abrasion damage.

For several different reasons, it is desirable to reduce the amount of uranium in the upper part of the fuel assembly in a fuel assembly intended for a boiling water reactor. One reason is that the high percentage of steam in the upper part of the fuel assembly leads to deteriorated neutron moderation, which results in the fuel not being burnt up as quickly in the upper part of the fuel assembly as in the lower part thereof. Another reason is that a reduction of the quantity of uranium in the upper part of the fuel assembly gives an improved shut-down margin. A consequence of the reduction of the quantity of uranium is that the free flow area increases, which leads to a reduction of the pressure drop in the upper part of the fuel assembly, and, therefore, the risk of thermohydraulic instability in the fuel assembly decreases.

Figures 12, 13:
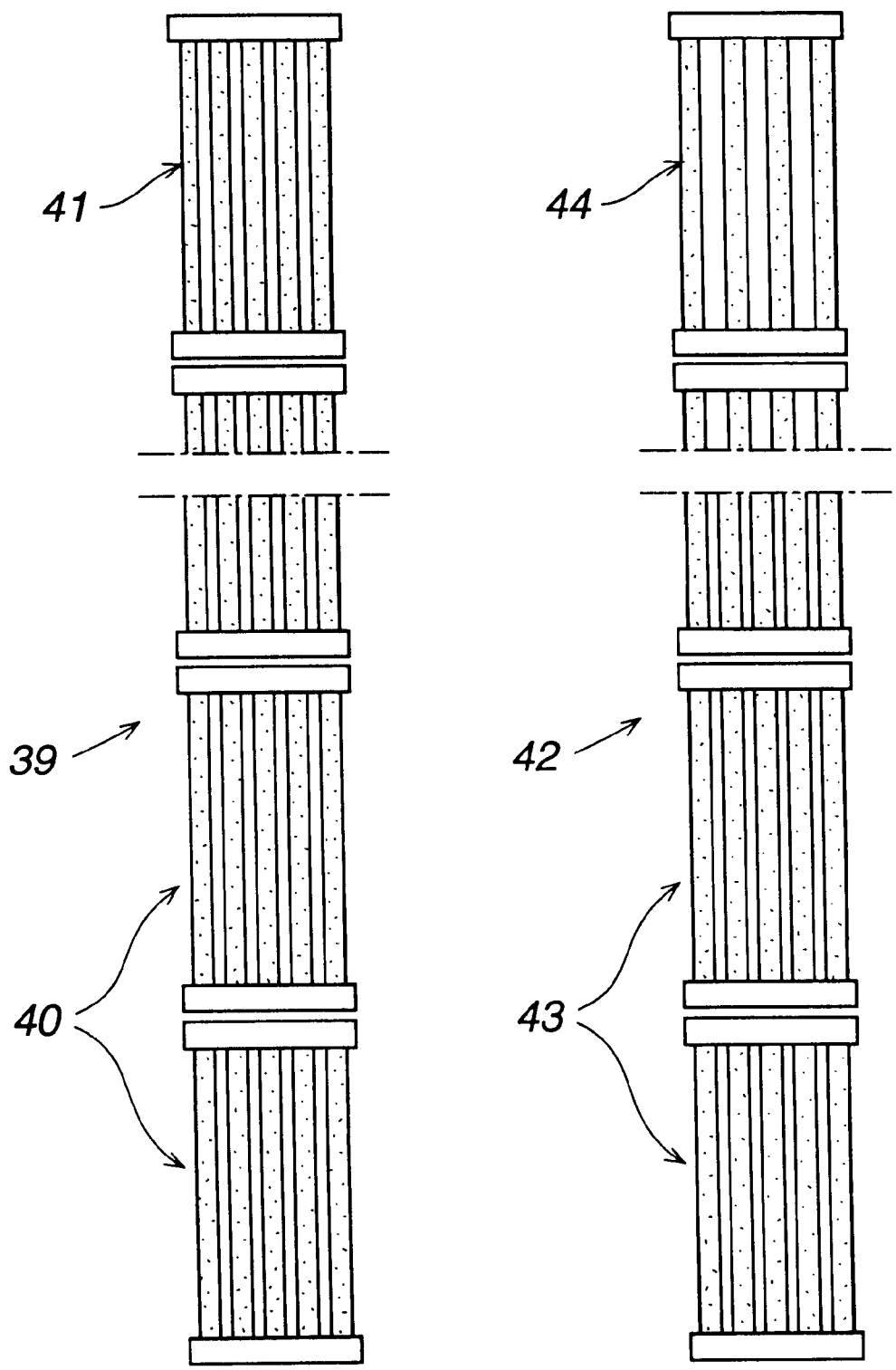
FIG. 12 schematically shows an embodiment of a fuel assembly according to the invention, where the fuel rods in the lower fuel units have a larger diameter than the fuel rods in the upper fuel units.
FIG. 13 schematically shows an additional embodiment of a fuel assembly according to the invention, where the number of fuel rods in the lower fuel units is larger than the number of fuel rods in the upper fuel units.

In a fuel assembly according to the invention, the quantity of uranium in different parts of the assembly may be varied in a simple manner. A fuel assembly may comprise fuel units with different numbers of fuel rods, different lattice configurations, and different fuel rod diameters. FIG. 12 shows a fuel assembly 39 which comprises fuel units (40, 41) of two different types, of which the first type contains fuel rods with a first diameter and the other type contains fuel rods with a second diameter. The first type of fuel units 40 is arranged in the lower part of the fuel assembly, and the second type of fuel units 41 is arranged in the upper part of the fuel assembly. The fuel rods in the lower fuel units 40 have a diameter which is larger than that of the fuel rods in the upper fuel units 41.

FIG. 13 shows a fuel assembly 42 where the number of fuel rods in the fuel units 43 in the lower part of the fuel assembly is larger than the number of fuel rods in the fuel units 44 in the upper part of the fuel assembly. The number of axial zones with different rod diameters or different number of rods may, of course, be greater than the two shown in the examples. It is also possible to have different rod diameters within the fuel units to attain optimum properties in the cross section.

Figures 14A, 14B, 14C, 14D:
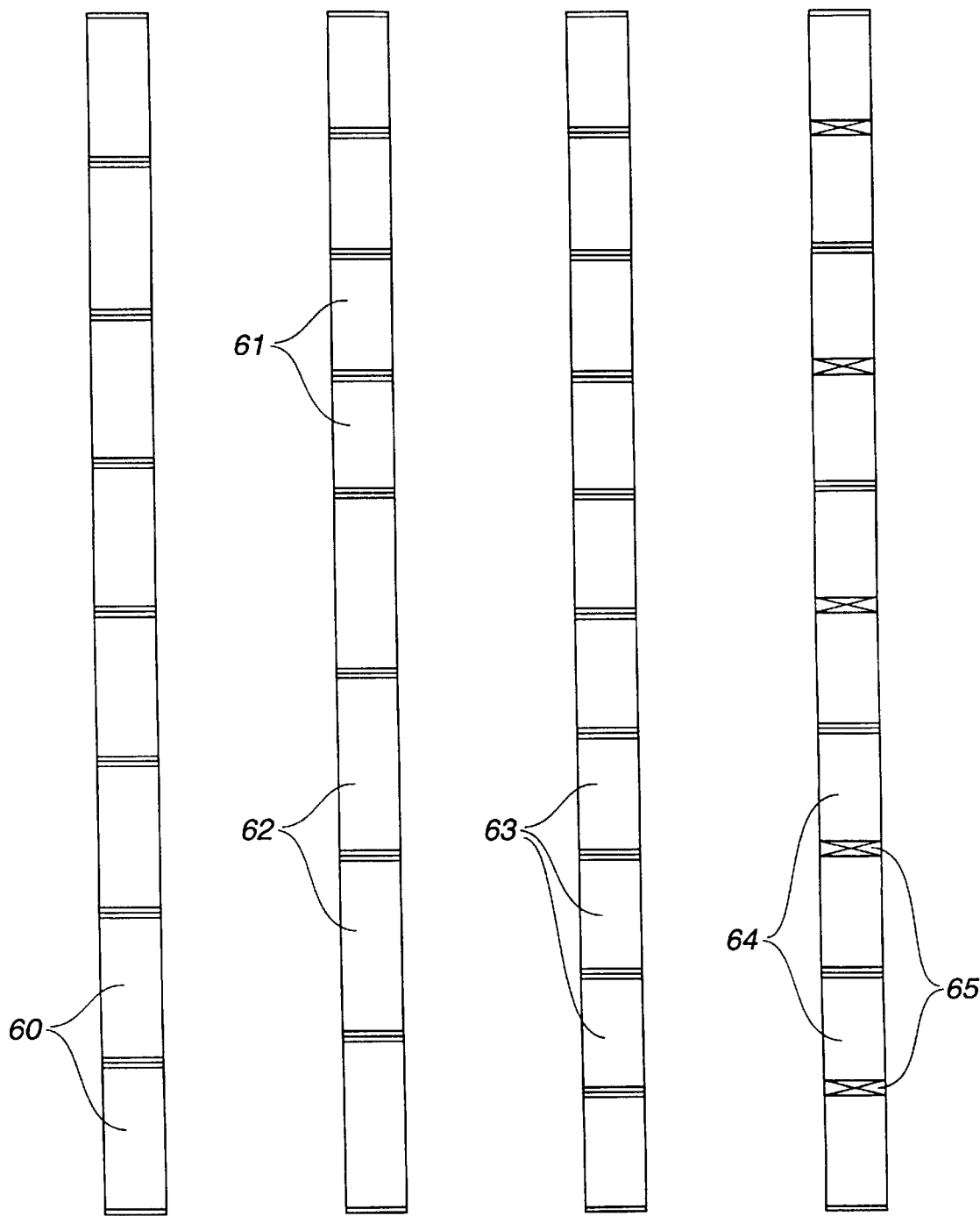
FIGS. 14a–14d schematically show how the height of the fuel units may vary in a fuel assembly and between the fuel assemblies.

A fuel assembly according to the invention may comprise fuel units with different height. FIG. 14a shows a fuel assembly which comprises eight equally long fuel units 60. FIG. 14b shows a fuel assembly which comprises eight fuel units with two different heights. The uppermost four fuel units 61 are shorter than the lowermost four fuel units 62. Since the top tie and bottom tie plates give rise to turbulence of the cooling water, it is advantageous, from the point of view of dryout, to have more top tie and bottom tie plates in the upper part of the fuel assembly than in the lower part thereof, which is achieved in this embodiment. FIG. 14c shows ten equally high fuel units 63. FIG. 14d shows five equally long fuel units 64, each one comprising a spacer 65 which keeps the fuel rods spaced-apart from each other and prevents them from bending or vibrating when the reactor is in operation.

FIG. 15a shows an example of a fuel assembly where the fuel units 69 in the upper part and the fuel units 68 in the lower part of the fuel assembly have different lattices. FIG. 15b shows a cross section through the fuel unit 69, and FIG. 15c shows a cross section through the fuel unit 68. The number of fuel rods is larger in the fuel units in the lower part of the fuel assembly than in the fuel units in the upper part thereof. It is also possible to omit rods in occasional lattice positions, preferably in the uppermost fuel units.

A fuel assembly according to the invention may also be optimized by the enrichment of uranium in the fuel rods varying between the different fuel units. Fuel units in the upper part of the fuel assembly may, for example, have a lower enrichment than fuel units in the lower part of the fuel assembly. The occurrence of burnable absorbers, for example gadolinium, may also vary between the fuel units.

Recently, the development has gone towards fuel assemblies with narrower fuel rods which are more in number. However, there is a limit to how narrow the rods may be if they are to have a length of about four meters. If the rod is too narrow, mechanical difficulties arise which may become very difficult to solve. A solution to these problems is to manufacture short fuel units. FIG. 16 shows a cross section of a fuel assembly with 12×12 fuel rod positions. The rod diameter is about 8 mm. With a plurality of rods, the linear load and hence the fission gas emission are reduced. The need of space for fission gas in the short rods is thus reduced, which facilitates such a design.

A fuel assembly with short fuel units has several advantages compared with a traditional fuel assembly with full-length fuel rods. One considerable advantage is the flexibility provided in designing the fuel assembly. This means that the fuel assembly in a simple manner may be optimized both in the axial direction and in the radial direction, for example with respect to lattices and fuel distribution. In connection with refuelling, certain fuel units may be replaced and certain may be allowed to remain in the fuel assembly. The fuel units which are allowed to remain in the fuel assembly may be given a new position. In this way, the service life of the fuel assembly increases.

If the height of the fuel units is sufficiently low, no spacers are needed, which is an advantage since the spacers increase the risk of abrasion damage. It is also easy to design the upper end of the rods with special abrasion protection in the sensitive region below the top tie plates. The consequence of abrasion damage or other cladding damage is reduced as the length of the fuel rods is reduced, since the quantity of uranium and fission products which may leak out is smaller. The risk of secondary damage is also reduced for short rods.

To achieve the above-mentioned advantages, the number of fuel units on top of each other may be at least three, preferably even more. To avoid using spacers, the number of fuel units should be more than six.

What is claimed is:

1. A nuclear light water moderated boiling water reactor comprising:
   a plurality of fuel assemblies arranged vertically in the reactor, the reactor being arranged such that water flows upwards through said fuel assemblies whereby part of the water is transformed into steam;
   at least one of the fuel assemblies comprising at least five fuel units stacked on top of each other, each fuel unit comprising a top tie plate and a bottom tie plate and a plurality of fuel rods extending between the top tie plate and the bottom tie plate;
   at least one of said fuel units having fuel rods of different diameters from fuel rods of another of said fuel units; and
   said at least one fuel assembly having a fuel channel with a substantially square cross section surrounding the stack of said at least five fuel units.

2. A nuclear light water moderated boiling water reactor according to claim 1, wherein at least two of the fuel units in said at least one fuel assembly differ from each other in at least one of the following respects:
   the fuel units have different numbers of fuel rods;
   the fuel units have different lattice configurations;
   the fuel units have different heights;
   the fuel units have bottom tie plates with different embodiments with respect to the mixing of coolant; and
   the fuel rods have different degrees of enrichment.

3. A nuclear light water moderated boiling water reactor according to claim 1, wherein said fuel units are retained by a spring arrangement arranged in an upper part of the fuel assembly.

4. A nuclear light water moderated boiling water reactor according to claim 1, wherein at least one fuel rod in said at least one fuel assembly comprises a top plug for attachment to the top tie plate of the fuel unit in which said at least one fuel rod is positioned and a bottom plug for attachment to the bottom tie plate of said fuel unit in which said at least one fuel rod is positioned, wherein, for receiving fissile gases, at least one of said top and bottom plugs is hollow and has an opening facing the interior of said fuel rod.

5. A nuclear light water moderated boiling water reactor according to claim 1, wherein at least one fuel rod in said at least one fuel assembly has a coating protecting against abrasion damage to that part of the cladding tube of the fuel rod which is nearest the top tie plate of the fuel unit in which the fuel rod is positioned.

6. A nuclear light water moderated boiling water reactor according to claim 1, wherein each of said fuel units comprises at least 80 fuel rod positions.

7. A nuclear light water moderated boiling water reactor according to claim 1 wherein the number of fuel units in said at least one fuel assembly is larger than six.

8. A method comprising:
   providing a fuel assembly in a nuclear light water moderated boiling water reactor arranged such that water flows upwards through said fuel assembly whereby part of the water is transformed into steam, said fuel assembly being arranged vertically in said reactor;
   providing at least five fuel units stacked on top of each other in said fuel assembly, each fuel unit comprising a top tie plate and a bottom tie plate and a plurality of fuel rods extending between the top tie plate and the bottom tie plate;
   providing, in at least one of said fuel units, fuel rods of different diameters from fuel rods of another of said fuel units;
   wherein said fuel assembly has a fuel channel with a substantially square cross section surrounding the stack of said at least five fuel units.

9. The method according to claim 8, wherein at least two of the fuel units in said at least one fuel assembly differ from each other in at least one of the following respects:
   the fuel units have different numbers of fuel rods;
   the fuel units have different lattice configurations;
   the fuel units have different heights;
   the fuel units have bottom tie plates with different embodiments with respect to the mixing of coolant; and
   the fuel rods have different degrees of enrichment.

10. The method according to claim 8, wherein said fuel units are retained by a spring arrangement arranged in an upper part of the fuel assembly.

11. The method according to claim 8, wherein at least one fuel rod in said fuel assembly comprises a top plug for attachment to the top tie plate of the fuel unit in which said at least one fuel rod is positioned and a bottom plug for attachment to the bottom tie plate of said fuel unit in which said at least one fuel rod is positioned, wherein, for receiving fissile gases, at least one of said top and bottom plugs is hollow and has an opening facing the interior of said fuel rod.

12. The method according to claim 8, wherein at least one fuel rod in said fuel assembly has a coating protecting against abrasion damage to that part of the cladding tube of the fuel rod which is nearest the top tie plate of the fuel unit in which the fuel rod is positioned.

13. The method according to claim 8, wherein each of said fuel units comprises at least 80 fuel rod positions.

14. The method according to claim 13, wherein the number of fuel units in said fuel assembly is larger than six.

* * * * *